United States Patent
Satoh

(10) Patent No.: US 6,984,075 B2
(45) Date of Patent: Jan. 10, 2006

(54) OPTICAL CONNECTOR WITH A COLORED DISTINGUISHABLE SHUTTER

(75) Inventor: Isao Satoh, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 82 days.

(21) Appl. No.: 10/167,469

(22) Filed: Jun. 13, 2002

(65) Prior Publication Data

US 2002/0191921 A1 Dec. 19, 2002

(30) Foreign Application Priority Data

Jun. 13, 2001 (JP) .................................... 2001-177984

(51) Int. Cl.
*G92B 6/38* (2006.01)
*G02B 6/36* (2006.01)

(52) U.S. Cl. ............................... 385/92; 385/55; 385/73
(58) Field of Classification Search ................... 385/56, 385/70, 73, 92, 55
See application file for complete search history.

(56) References Cited

U.S. PATENT DOCUMENTS

| | | | | |
|---|---|---|---|---|
| 5,577,146 A | * | 11/1996 | Musk | 385/92 |
| 5,687,268 A | * | 11/1997 | Stephenson et al. | 385/73 |
| 5,973,860 A | * | 10/1999 | Bergmann et al. | 359/811 |
| 6,052,172 A | | 4/2000 | Kajiwara | |
| 6,095,862 A | * | 8/2000 | Doye et al. | 439/607 |
| 6,340,246 B1 | * | 1/2002 | Yoshida et al. | 385/73 |
| 6,352,375 B1 | * | 3/2002 | Shimoji et al. | 385/92 |
| 6,404,972 B1 | * | 6/2002 | Pasch et al. | 385/147 |
| 6,572,274 B1 | * | 6/2003 | Margaliot et al. | 385/75 |
| 6,612,619 B2 | * | 9/2003 | Wieder | 285/23 |
| 2002/0081076 A1 | * | 6/2002 | Lampert et al. | 385/70 |
| 2002/0118931 A1 | * | 8/2002 | Ohbayashi et al. | 385/88 |

FOREIGN PATENT DOCUMENTS

| | | |
|---|---|---|
| JP | 6-201952 A | 7/1994 |
| JP | 2000-131564 A | 5/2000 |
| JP | 2002-250845 A | 9/2002 |
| TW | 374261 | 11/1999 |

\* cited by examiner

*Primary Examiner*—John D. Lee
*Assistant Examiner*—Tina M Lin
(74) *Attorney, Agent, or Firm*—Birch, Stewart, Kolasch & Birch, LLP

(57) ABSTRACT

An optical connector which includes an insertion opening for inserting therein a plug section of an optical fiber cable. There is an optical element which is to be optically connected to the optical fiber cable as inserted in the insertion opening, and a shutter for opening and closing the insertion opening. The shutter is to be mounted to an apparatus and serves as a connector to the apparatus. The shutter is arranged so as to be distinguishable from an optical connector of other type by the color of the shutter which is exposed to the outside when mounting the optical connector to an apparatus.

14 Claims, 17 Drawing Sheets

SHUTTER OPEN STATE

SHUTTER CLOSED STATE

SHUTTER OPEN STATE

SHUTTER CLOSED STATE

SHUTTER OPEN STATE

PROTECTIVE CAP CLOSED STATE

PROTECTIVE CAP CLOSED STATE

PROTECTIVE CAP OPEN STATE

PROTECTIVE CAP OPEN STATE

SHUTTER CLOSED STATE

SHUTTER CLOSED STATE

SHUTTER OPEN STATE

SHUTTER OPEN STATE

SHUTTER CLOSED STATE

SHUTTER CLOSED STATE

SHUTTER OPEN STATE

SHUTTER OPEN STATE

OPTICAL CONNECTOR WITH A COLORED DISTINGUISHABLE SHUTTER

BACKGROUND OF THE INVENTION

Field of the Invention

The present invention relates to an optical connector adopted in AV apparatuses or optical data transmission apparatuses, etc., for transmitting light by optically connecting an optical fiber cable inserted in a plug insertion opening to an optical element held within the optical connector.

In recent years, the digital signal transmission technologies using optical communications have been used in a variety of household apparatuses. Such household apparatus has a protection mechanism in a transmission section of a transmission-side optical connector, and a receiving section of the receiving-side optical connector, for preventing contamination of dust particles into a connected part where the light transmission section or the light receiving section is connected to an optical fiber cable optically or mechanically when the transmission is not performed using the optical fiber cable, or preventing the contamination of flux or foreign particles when assembling a substrate.

The schematic structure of the first optical connector, which adopts a protection cap as the foregoing protection mechanism, is shown in FIGS. 8(a) through 9(b). FIGS. 8(a) and 8(b) show the state where the protection cap is inserted (protection cap closed state). FIG. 8(a) is the side view of the first conventional optical connector, and FIG. 8(b) is the front view as seen from the side of a plug insertion opening. On the other hand, FIGS. 9(a) and 9(b) show the state where the protection cap is pulled out (protection cap open state). FIG. 9(a) is a front view of the first conventional optical connector as seen from the side of the plug insertion opening, and FIG. 9(b) is a side view of the first conventional optical connector.

The first conventional optical connector shown in FIGS. 8(a) through 9(b) is provided with optical elements for at least receiving light or transmitting light in a holder 100. The first conventional optical connector is arranged such that a protective cap 101 is fit into a plug insertion opening 102 of the optical connector when the optical fiber cable is not used. Namely, the protection cap 101 is inserted in a direction of an arrow shown in FIG. 9(b) and is pulled out in the direction of an arrow. With this structure, in the state where the optical connector is not used, i.e., the state where the plug section of the optical fiber cable is not inserted into the plug insertion opening 102 of the optical connector, the plug insertion opening of the optical connector is completely sealed by the protection cap 101 so as to prevent contaminations of foreign particles from the outside.

According to the structure of the foregoing protection cap 101, however, a grab is needed to enable the insertion and extraction of the plug, which makes the overall size of the protection mechanism larger, and it is necessary to pull out the protection cap 101 when using the optical fiber cable. Furthermore, it is necessary to store the protection cap 101 when the optical fiber cable is not used, and it is necessary to make a careful choice for the storage place to be outside of small children's reach to prevent such problem that the protection cap 101 is swollen by them.

In response, another optical connector (second conventional optical connector) is disclosed. The schematic structure of the second conventional optical connector is shown in FIGS. 10(a) through 11(b). As illustrated in these figures, the second conventional optical connector adopts an out-swinging shutter as the protection mechanism in replace of the foregoing protection cap 101 of the first conventional optical connector. FIGS. 10(a) and 10(b) show the closed state of the shutter, wherein FIG. 10(a) is the side view of the second conventional optical connector, and FIG. 10(b) is the front view as seen from the side of a plug insertion opening. On the other hand, FIGS. 11(a) and 11(b) show the open state of the shutter. FIG. 11(a) is a front view of the second conventional optical connector as seen from the side of the plug insertion opening, and FIG. 11(b) is a side view of the second conventional optical connector.

This optical connector is provided with an optical element stored in a holder 200, for at least either emitting light or receiving light, and is arranged so as to close the plug insertion opening 202 with the out-swinging shutter 201 when the optical fiber cable is not used. Specifically, as illustrated in FIG. 11(b), the out-swinging shutter 201 is opened to the outside and is closed in the direction of an arrow Y with the insertion and extraction of the plug section 203a of the optical fiber cable 203 in the direction of an arrow X.

As described, by adopting the out-swinging shutter 201, it is not necessary to take out the protection cap when using the optical fiber cable. Moreover, since the shutter 201 is attached to the optical connector, the protection mechanism is safe to use without the need of storing the protection mechanism.

However, according to the foregoing structure, it is necessary to open the shutter 201 to the outside, and a significant improvement cannot be recognized from the first conventional optical connector. If the shutter 201 is still open after pulling out the plug, it is necessary to close the shutter 201. Furthermore, as a handle is needed to open or close the shutter 201, an overall size of the apparatus becomes larger to some extent.

Another optical connector (third conventional optical connector) is disclosed. The third conventional optical connector is provided with an in-swinging shutter without adopting the protection cap 101. The schematic structure of the third conventional optical connector with the in-swinging shutter is shown in FIGS. 12(a) through 13 (b). FIGS. 12 (a) and 12 (b) show the closed state of the shutter, wherein FIG. 12(a) is the side view of the third conventional optical connector, and FIG. 12(b) is the front view as seen from the side of a plug insertion opening. On the other hand, FIGS. 13(a) and 13(b) show the open state of the shutter. FIG. 13(a) is a front view of the second conventional optical connector as seen from the side of the plug insertion opening, and FIG. 13(b) is a side view of the third conventional optical connector.

The third conventional optical connector is provided with optical elements 304 for at least receiving light or transmitting light stored in a holder 300 and is arranged so as to close the plug opening 302 with the in-swinging shutter 301 when the optical fiber cable is not used.

The third optical connector is provided with the spring 305 with two arms, which is mounted to an axial section 306 serving as a rotation axis. With this structure, one of the two arms of the spring 305 is in contact with back surface of the shutter 301, and the other is in contact with the inner surface above the holder 300 so that the in-swinging shutter 301 rotates automatically with insertion and extraction of the plug section 303a of the optical fiber cable 303.

Namely, when the optical fiber cable is not used, the in-swinging shutter 301 is closed so as to seal the plug insertion opening 302, and by depressing the in-swinging shutter 301 to insert the plug 303a, the shutter 301 is opened by rotating to the inside of the holder 300 about the axial section 306 as the rotation axis, and after the plug section 303a is pulled out, the shutter 301 rotates automatically to the closed position by the restoring force (elastic force) of the spring 305.

The foregoing structure of the third optical connector eliminates the deficiencies of the second conventional optical connector provided with the out-swinging shutter 201.

With the foregoing third conventional optical connector, however, the following problem remains unsolved.

The plug section of the optical fiber has a square shape, which has a pair of semicircular band-shaped projections as projected guide section (303b in FIG. 13(b)). Further, as illustrated in FIGS. 14(a) and 14(b), a pair of semicircular groove sections is formed on the inner surface of the plug insertion opening 302 of the optical connector. With this structure, by inserting the plug section 303a to a predetermined position by sliding the guide projections along the pair of semicircular groove sections formed at opposing positions, the optical element 304 stored in the holder 300 and the emitting end face (insertion end face) of the leading end of the plug section 303a of the optical fiber cable can be optically connected. FIGS. 14(a) and 14(b) are front views of the third conventional optical connector when seen from the side of the plug insertion opening, wherein FIG. 14(a) shows the closed state of the shutter, while FIG. 14(b) shows the open state of the shutter.

However, as illustrated in FIGS. 14(a) and 14(b), according to the structure of the third conventional optical connector, the shutter 301 is arranged so as to open upward (longitudinally) about the rotation axis which is substantially parallel to the line connecting the guide groove sections 307 and the inner surface of the plug insertion opening 302 facing the guide groove section 307, i.e., the line connecting the pair of guide groove sections 307 formed at opposing positions. It is therefore not possible to completely seal the guide groove sections 307 on both side faces of the plug insertion opening 302. Namely, with the foregoing structure of the third conventional optical connector, in the closed state of the shutter, it is not possible to completely seal the plug insertion opening 302, and due to the resulting spacing of the guide groove sections 307, the contamination of the foreign substances cannot be prevented completely.

One way to prevent the foregoing problem is to make the shutter 301 larger. However, when doing so, the guide grooves 307 cannot extend in the backward direction of the plug insertion opening, and the plug section 303a of the optical fiber cable 303 cannot be inserted to the predetermined position. As a result, a desirable optical connection with the optical element 304 cannot be ensured.

It may be also arranged so as to form a sealing section for sealing the guide grooves 307 in the shutter 301. In this case, the holder 300 is generally formed with a resin material by a mold, and it is necessary to form the groove sections for the holder 300 on the inner surface of the plug insertion opening. As a result, the mold becomes completed in its structure, and manufacturing costs would be increased. Furthermore, when forming the guide groove closing sections in the shutter 301, the groove sections on the inner surface of the plug insertion opening 302 for the sealing section would be branched from the guide groove section 306. As a result, the plug section 303a cannot be inserted into the predetermined position, which makes the optical connection with the optical element 304 difficult or even causes a damage of the groove sections.

Moreover, according to the third conventional optical connector, as illustrated in FIGS. 15(a) and 15(b), the rotation axis of the spring 305 coincides with the rotation axis 306 which serves as the rotation axis of the shutter 301, and as illustrated in FIG. 13(a), the surface of the shutter in front of the axis section 306 is exposed when seen from the side of the plug insertion opening. FIGS. 15(a) and 15(b) are cross-sectional views of the side face of the third conventional optical connector, wherein FIG. 15(a) shows the state where the plug section 303a is inserted completely, and FIG. 15(b) shows the state where the plug section 303a is inserted or extracted half way.

Therefore, when inserting the plug, the leading end of the plug section 303a, which depresses the shutter 301 may damage the axis section 306 when inserting the plug as a result of receiving overweight when pushing out the portion of the shutter 301 in front of the axis section 306 when seen from the side of the plug insertion opening.

Furthermore, as illustrated in FIGS. 15(a) and 15(b), a pair of projected fitting hooks is formed on the plug section 303a on both side faces where the guide protruded portions 303b are not formed. Then, on the inner surface of the plug insertion hole 302, the recessed fitting hooks are formed, and the projected fitting hooks 303c are fit into the recessed fitting hooks 308.

According to the third conventional optical connector, it is necessary to form the recessed fitting hook 308 in which one of the pair of projected fitting hooks 303c is to be fit. Therefore, as illustrated in FIG. 15(b), whenever inserting or extracting the plug section 303a in the direction of an arrow X, the axial section 306 receives overweight. This is because the weight moving direction (direction of the arrow Y in FIG. 15(b)) from the projected fitting hooks 303c differs from the rotating direction of the shutter 301. As a result, the axial section 306 receives load. Therefore, in order to prevent the damage of the axis section 306 by the foregoing load, it is therefore necessary to adopt a high intensity material such as a metal coin for the axis section 306.

According to the third conventional optical connector, a spring 305 for automatically closing the shutter 301 with the extraction of the plug section 303a is provided so as to be round around an axis section 306 which is need to be formed by a separate member as a necessity, and both arm sections of the spring 305 are made in contact with the back surface of the shutter 301 and the holder 300. Therefore, as illustrated in FIG. 16 which shows the structure of the rotation axis, the spring is formed so as to go through the axis section 306 made of metal or a similar material, and further the axial section 306 to which the spring 305 is mounted is fit into the shutter 301 to manufacture a final product of the shutter with spring. As described, by the nature of the case, it takes time to assemble the foregoing third conventional optical connector.

Additionally, as the both arm sections of the spring 305 differ in length, it is necessary to set the assembling direction with precision to ensure the required function of the spring 305.

Furthermore, when mounting the spring 305 to the axis section 306, the size of the protruded section on the side face of the holder 300 in a vicinity of the plug insertion opening (L in FIG. 14(a)) becomes larger by the storage space for the axis section 306 and the spring 305. Therefore, when the protruded section on the side face of the holder 300 in a vicinity of the plug insertion opening becomes larger than the optical connector (FIGS. 8(a) through 9(b)) adopting the protection cap 101 of the first prior art becomes larger than the optical connector (FIGS. 8(a) through 9(b)) adopting the protection cap 101 of the first prior art protection cap 101, in the apparatus mounting the optical connector, it is necessary to alter the shape of the hole section (exposed to the outside) for making the protruded section on the side face of the holder 300 visible.

Other than the described problems, the conventional optical connector also faces the following problem.

The described conventional optical connector is arranged so as to print out the product name on the back surface of the holder 100, 200 or 300 as a main body (different face from the face with the hole) by the laser marker, so that one can recognize, for example, the manufacturer of the optical connector, the assembler of the optical connector into the apparatus, or determine whether the optical connector in one's possession is the transmitting end optical connector or the receiving end optical connector.

FIG. 17 shows the state where the transmitting end optical connector 31 and the receiving end optical connector 32 are mounted to the apparatus 33.

The optical connectors 31 and 32 are mounted to the input/output terminal section formed on the front surface or back surface of the apparatus 33, and the hole and the portion surrounding the hole are exposed, and other portion is stored within the apparatus 33.

As a result, the product name would be hidden in the apparatus 33. In response, the indication of input and output is made at position above or below the insertion hole of the apparatus main body (upward in the Figure) so that the user can distinguish the transmitting side optical connector (optical output) 31 from the receiving side optical connector (optical input).

For the discrimination or identification of the product (kind) of the optical connector, the conventional optical connector has the following problem.

Namely, the transmitting end optical connector and the receiving end optical connector are typically formed in the same shape and color, and it is therefore difficult to one from the other instantaneously.

Additionally, for the apparatus mounting the optical connector, the optical signal input/output section is typically formed on the back surface of the apparatus, and when the user mounts the optical fiber cable after installing the apparatus, the optical input and output terminals in the same shape and color are difficult to be distinguished one from the other. For this reason, such problem that the respective optical input/output terminals get mixed up when installing the optical fiber cable.

Furthermore, for the third conventional optical connector, as illustrated in FIGS. 14(a) and 14(b), there is a spacing between the main body 300 and the shutter 301, or between the pair of guide grooves 307. Therefore, when mounting the transmitting end optical connector adopting the optical element and the light emitting element in the front face of the apparatus, in the state where the optical fiber cable has not been inserted, light would leak from the spacing between the main body 300 and the shutter 301, or the spacing between the pair of guide grooves 307, which makes the user uneasy.

SUMMARY OF THE INVENTION

It is therefore an object of the present invention to provide an optical connector, which permits the kind of the optical connector to be discriminated or identified with ease.

It is another object of the present invention to provide an optical connector which makes light as leaked less recognizable.

In order to achieve the above object, the optical connector in accordance with the present invention is arranged so as to include:

an insertion opening for inserting therein a plug section of an optical fiber cable, an optical element which is to be optically connected to the optical fiber cable as inserted in the insertion opening, and a shutter for opening and closing the insertion opening; and which is to be mounted to an apparatus and serves as a connector of the apparatus, the optical connector, comprising:

discrimination means in a part exposed to the outside for making the optical connector distinguishable from an optical connector of other type.

According to the foregoing structure, the type of the optical connector (the transmitting end optical connector or the receiving end optical connector) can be identified with ease both in the state where the optical connector is mounted to the apparatus and the state where the optical connector is not mounted without opening or closing the shutter.

It is desirable that the optical connector having the above structure be further arranged such that the shutter has similar color to an emission color of the optical element.

According to the foregoing structure, the light as leaked from the spacing between the optical connector main body and the shutter can be made less noticeable.

For a fuller understanding of the nature and advantages of the invention, reference should be made to the ensuing detailed description taken in conjunction with the accompanying drawings.

BRIEF DESCRIPTION OF THE DRAWINGS

FIGS. 2(a) and 2(b) are explanatory views illustrating the schematic structure of the optical connector in accordance with the present embodiment when seen from the plug insertion opening side wherein FIG. 2(a) shows the closed state of a shutter, and FIG. 2(b) shows an open state of the shutter.

FIGS. 3(a) and 3(b) are cross-sectional views of the upper surface taken along a line A—A of FIG. 1, wherein FIG. 3(a) shows the closed state of a shutter, and FIG. 3(b) shows an open state of the shutter.

DESCRIPTION OF THE INVENTION

The following descriptions will discuss one embodiment of the present invention with reference to Figures.

Figure 1:
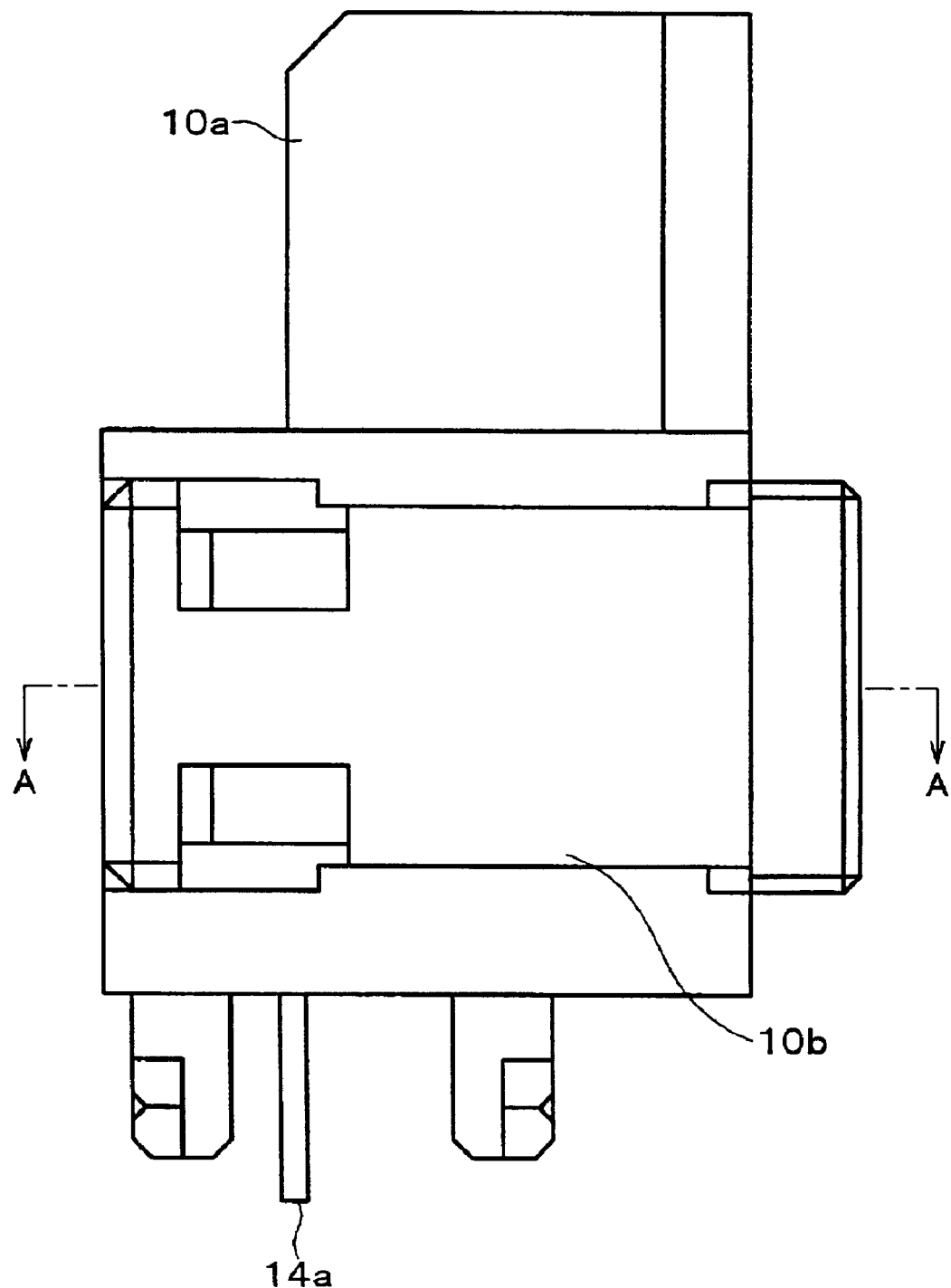
FIG. 1 is a side view illustrating the schematic structure of an optical connector in accordance with one embodiment of the present invention.
Figure 2:
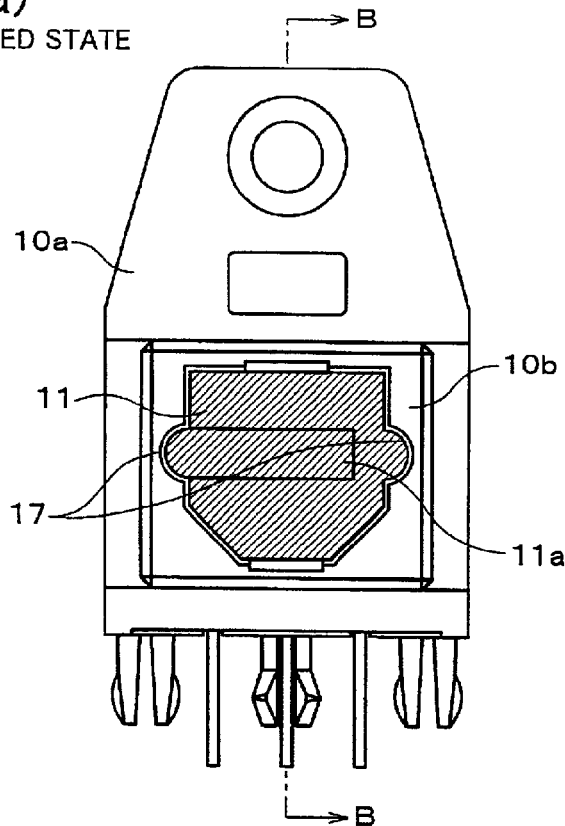
Figure 2:
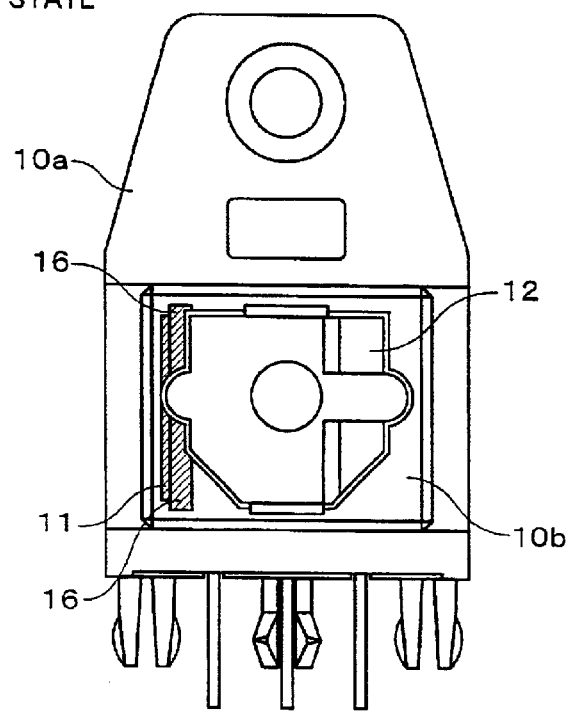
Figure 3:
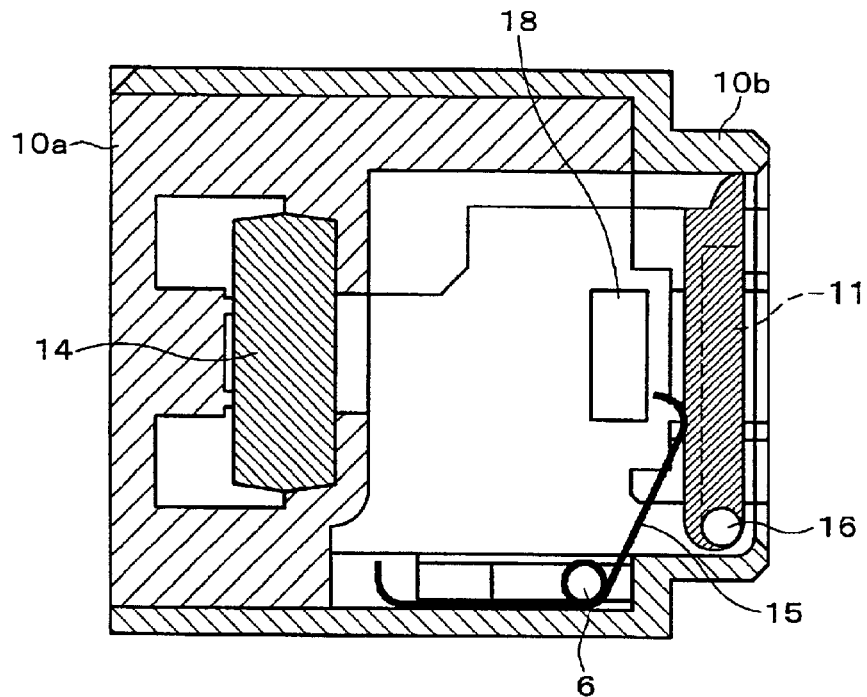
Figure 3:
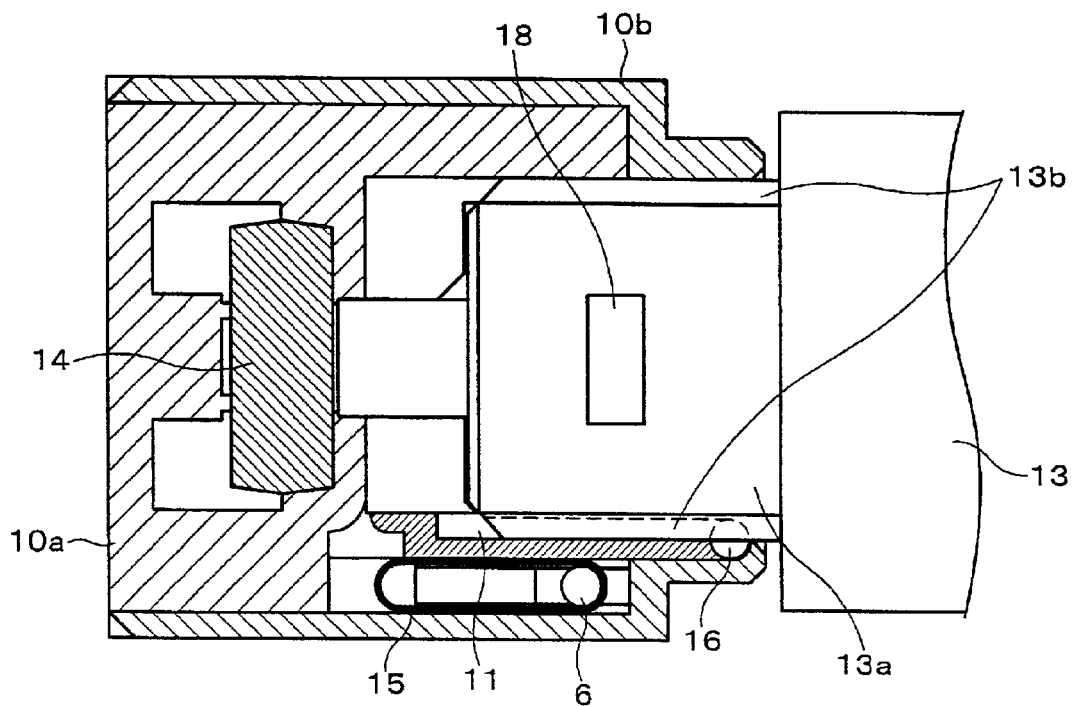
Figure 4:
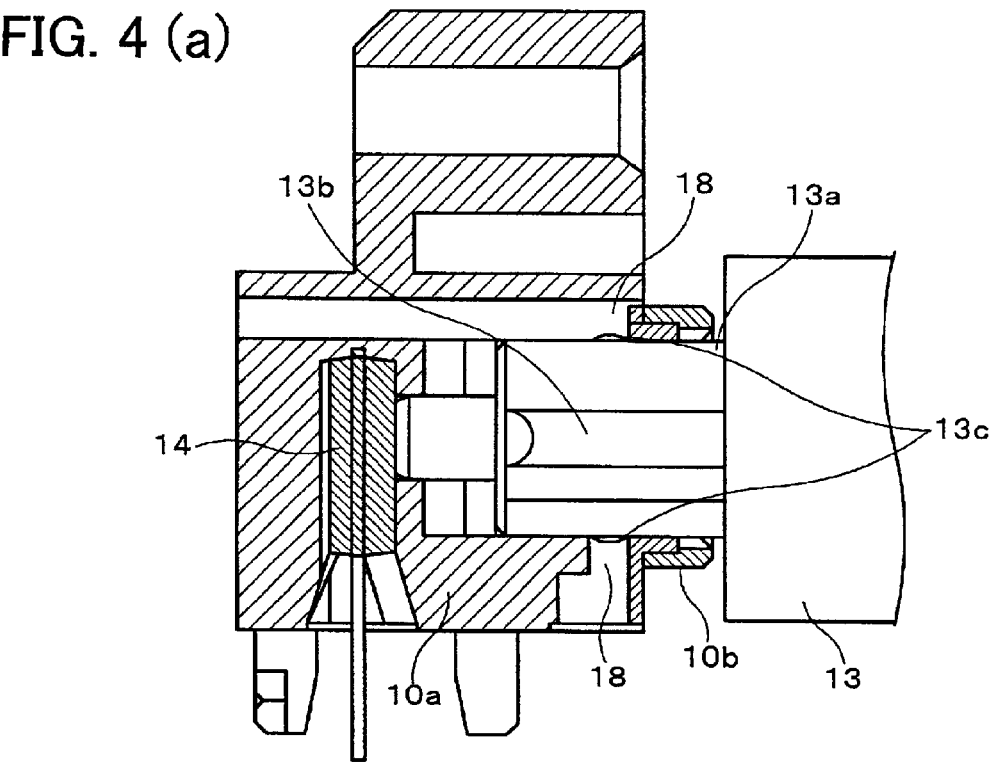
FIG. 4(a) is a cross-sectional view of the side surface if the shutter in the open state taken along a line B—B of FIG. 2(a)
FIG. 4(b) shows the closed state of the shutter taken along a line cutting the spring of FIG. 2(a).
Figure 4:
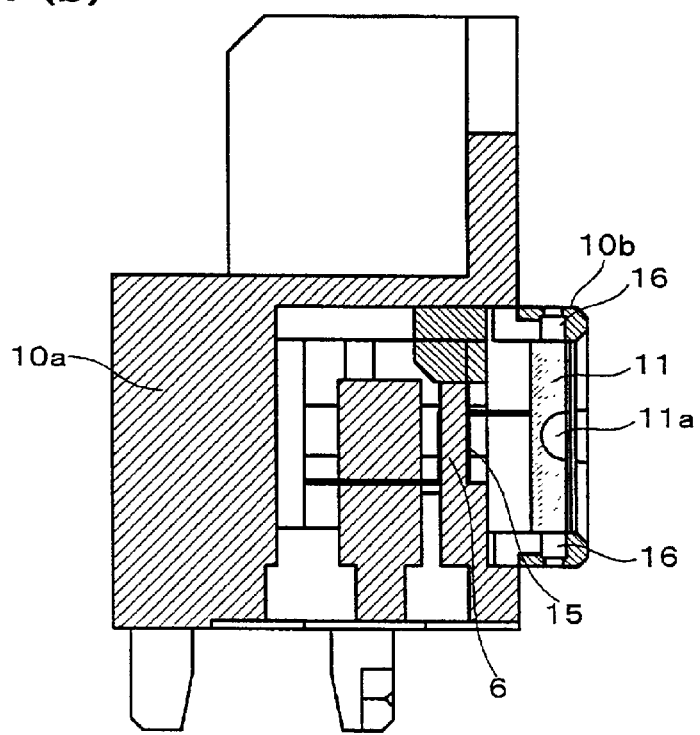

The schematic structure of the optical connector in accordance with the present embodiment is shown in FIG. 1 and FIG. 2(a) to FIG. 4(b). FIG. 1 is a side view of the optical connector. FIGS. 2(a) and 2(b) are front views illustrating the schematic structure of the optical connector in accordance with the present embodiment when seen from the plug insertion opening side wherein FIG. 2(a) shows the closed state of a shutter, and FIG. 2(b) shows an open state of the shutter. FIGS. 3(a) and 3(b) are cross-sectional views of the upper surface taken along a line A—A of FIG. 1, wherein FIG. 2(a) shows the closed state of the shutter, and FIG. 2(b) shows an open state of the shutter. FIG. 4(a) is a cross-sectional view of the side surface of the shutter in the open state taken along a line B—B of FIG. 2(a), and FIG. 4(b) shows the closed state of the shutter taken along a line cutting the coil section of the spring of FIG. 2(a).

The optical connector in accordance with the present embodiment includes an optical element 14, and a holder made up of a main holder 10a and a sub-holder 10b. This optical element 14 either receives light or emits light. When the plug section 13a of an optical fiber cable 13, which holds the optical element 14, is inserted into a plug insertion opening 12, the optical element 14 is optically connected to the fiber cable 13. As shown in FIGS. 2(a) and 2(b), the optical connector further includes a pair of guide groove sections 17 formed on an inner surface of the plug insertion opening 12, corresponding to projected guide sections 13b (band-shaped projected sections) (see FIG. 3(b)) formed on the side face of the plug section 13a. A shutter 11 is formed in the inside of the inner surface of the plug insertion opening so as to swing about a rotation axis (axial part 16) to open and close the plug insertion opening 12. This axial part 16 is formed in the direction substantially vertical to the line connecting the pair of guide groove sections 17 formed at opposing positions in the inner surface of the plug insertion opening 12.

In the case of the present embodiment, for the plug section 13a of the optical fiber cable 13, a square plug is adopted, and on one of the pair of the faces, which is positioned on an opposite side of the square cross-section, formed is a projected guide section 13b, and a projected fitting hook 13c is formed on the other surface. Therefore, the guide groove section 17 corresponding to the projected guide section 13b is also formed on the surface opposite to the pair of faces in the open state of the shutter 11. In the case of the present embodiment, the axial part 16 which serves as the rotation axis of the shutter 11 is formed in the direction substantially vertical to the line connecting to the pair of guide groove sections formed at opposing positions in the inner surface of the plug insertion opening 12. Then, a pair of recessed fitting hook sections 18 corresponding to a pair of projected fitting hook sections 13c is formed on the other of the opposing faces in which the guide groove sections 17 are not formed.

In the present embodiment, the holder which serves as a holding member is composed of a main holder 10a for holding the optical element 14 and a sub-holder 10b with the plug insertion opening 12 to be fit from the front side of the main holder 10a.

As illustrated in FIG. 1, by appearances, the leading terminal section 14a of the optical element 14 is exposed.

As illustrated in FIG. 2(a), the optical connector in accordance with the present embodiment is arranged so as to close the guide groove sections 17 in the closed state of the shutter 11.

As illustrated in FIG. 2(a) and FIG. 4(b), the optical connector in accordance with the present embodiment is also arranged such that the shutter 11 has a guide groove section 11a.

As illustrated in FIG. 2(b), the optical connector in accordance with the present embodiment is arranged such that a portion surrounding the axial part 16 which serves as the rotation axis of the shutter 11 is stored in the sub-holder 10b than the opening of the plug insertion opening 12. Namely, when seen from the side of the plug insertion opening, the front face of the axial part 16 of the shutter is covered with the sub-holder 10b. As a result, when inserting the plug section 13a, the axial part 16 is covered, and thus the axis part 16 can be protected without the problem associated with the conventional structure that the axis part 16 receives load as being depressed by the leading end of the plug section 13a.

The optical connector in accordance with the present embodiment is also provided with a spring 15 (elastic member) for closing the shutter, which is opened by the insertion of the plug section 13a of the optical fiber cable 13, with the extraction of the plug section 13. This spring 15 is provided with a pair of arm sections. One of the arm sections is in contact with the back surface of the shutter 11, and the other is in contact with the sub-holder 10b. These arm sections of the spring 15 are of the same length.

As illustrated in FIGS. 3(a) and 3(b), the spring 15 rotates such that these arm sections rotate about the axial part 16 which is separately provided in parallel to the axial part of the rotation axis of the shutter 11. Furthermore, the leading end of one arm section of the spring 15 in contact with the back surface of the shutter is rounded, while the other arm section of the spring 15 in contact with the other sub-holder 10b is also rounded.

As described, the optical connector in accordance with the present embodiment is also arranged so as to include the optical element 14 stored in the main holder 10a, wherein the plug insertion opening 12 formed in the sub-holder 10b is closed with the shutter 11 when the optical fiber cable is not used, while the side-opening shutter 11 is opened with the insertion of the plug section 13a of the optical fiber cable 13 into the plug insertion opening 12.

The foregoing optical connector in accordance with the present embodiment is also arranged such that as being guided by a pair of projected guide sections 13b and a pair of guide grooves 17 formed in the inner surface of the plug insertion opening 12 and the guide groove sections 11a formed on the surface of the shutter 11 to predetermined positions, a pair of projected fitting hooks 13c formed on the other side face of the plug section 13a is fit in the recessed fitting hook sections 18 on the inner surface facing the plug insertion opening 12, and the plug section 13a is fixed to a predetermined position. In this way, the optical element 14 is optically connected to the light emission end face (or light receiving end face) of the leading end of the plug section 13a.

Then, when the plug section 13a of the optical fiber cable 13 is extracted after being used, the arm sections in contact with the back surface of the shutter 11 of the spring 15 rotate about the axial section (rotation axis), and by the resulting force (elastic force), the shutter 11 of the spring 15 rotates about the axial section 16 (rotation axis), and the shutter 11 is brought in contact with a part of the inner surface of the sub-holder 10b, thereby automatically closing the plug insertion opening 12.

As described, with the insertion and extraction of the plug section 13a of the optical fiber cable 13 in and out the plug insertion opening 12, the shutter 11 can be closed/opened automatically. According to the foregoing structure, the guide groove sections 17 are closed in the state where the plug insertion opening 12 is closed with the shutter 11, and the spacing is not formed unlike the case of the third conventional optical connector. As a result, the contamination of flux or foreign particles can be surely prevented.

According to the foregoing structure, it is not necessarily to adopt a relatively firm structure, and the axial section 6 of the spring 15 which becomes larger in size for the spring 15 is stored within the main holder 10a. As a result, unlike the third conventional prior art, the projected section on the side face of the holder in a vicinity of the plug insertion opening does not become larger in size, and the optical connector of the present embodiment can be formed in substantially the same size as that of the first conventional prior art without the protection cap.

Additionally, although the guide groove sections 11a are formed on the surface of the shutter 11, the recessed fitting hooks as required in the third conventional optical connector can be omitted. Thus, the load as applied to the axial part 16 of the shutter 11 when inserting and extracting the plug section 13a can be significantly reduced, and the plug section 13a can be inserted and extracted smoothly, thereby preventing the axial section 16 from being damaged.

The leading ends of the arm sections of the spring 15 are rounded to enable smoother insertion and extraction of the plug section 13a. Namely, the axis section 6 which serves as the rotation axis of the spring 15 does not coincide to the axis section 16 which serves as the rotation axis of the shutter 11, and the leading ends of the arm sections of the spring 15 in contact with the back surface of the shutter 11 slide on the back surface of the shutter 11. Therefore, by rounding the leading ends of the arm sections, the plug section 13a can be inserted and extracted smoothly by smoothly sliding without being caught.

Additionally, in order to insert or extract the plug section 13a smoothly, on the back surface of the shutter 11, the sliding portion of the arm sections of the spring 15 may be processed to form sliding grooves or finished with mirror.

The assembling process of the optical connector in accordance with the present embodiment will be explained in reference to FIGS. 5(a), 5(b) and 6 which are cross-sectional views of the upper surface.

Figure 5:
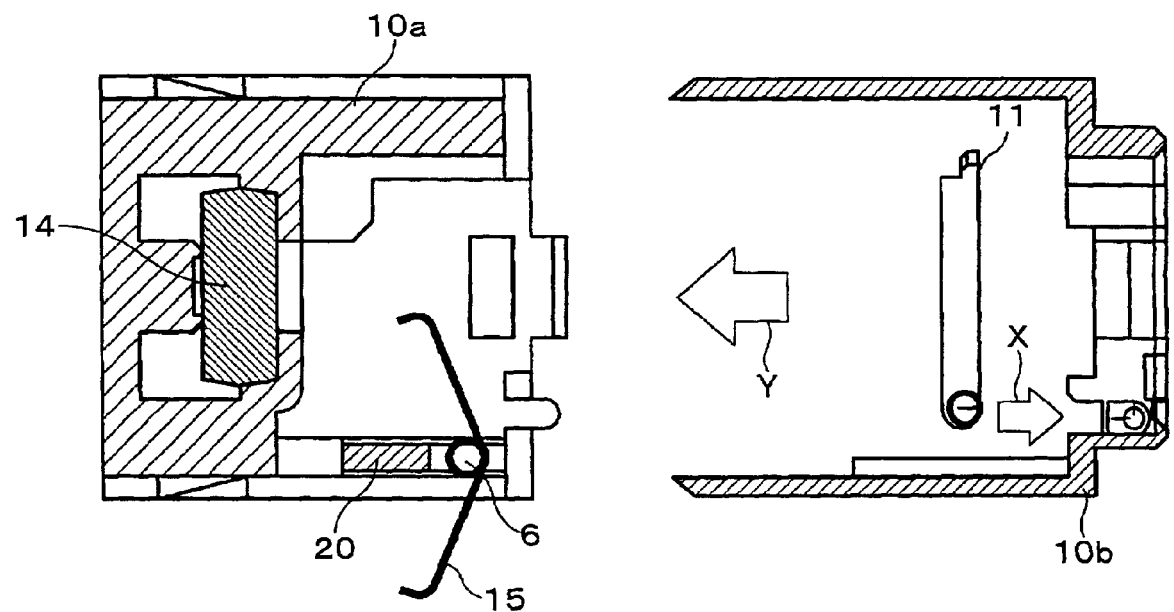
FIGS. 5(a) and 5(b) are cross-sectional views of the upper surface, which explains the process of assembling the optical connector in accordance with the present embodiment.
Figure 5:
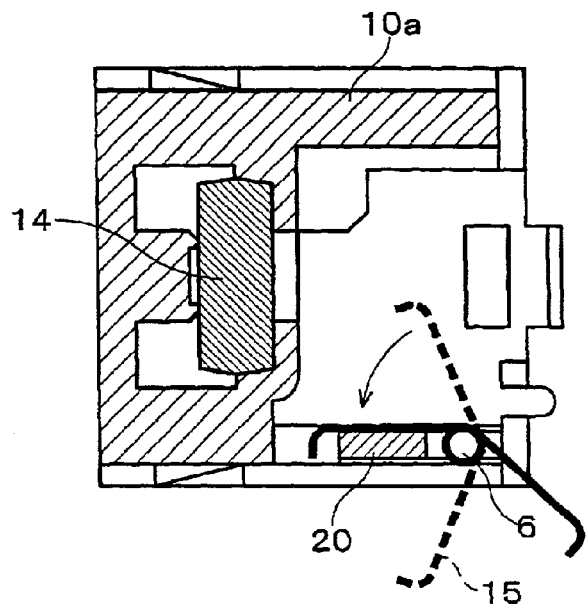

First, as illustrated in FIG. 5(a), the optical element 14 is mounted to the main holder 10a, and the coil section of the spring 15 is inserted into the axis section 6. Here, as the both arms of the spring 15 have the same length, when setting the spring 15 into the axis section 6, the problem associated with the third conventional structure that the arm sections are inserted with wrong length can be prevented. For the axis section 6, a different material such as metal, etc., may be used, or may be formed with the main holder 10a from resin material, etc.

On the other hand, in the sub-holder 10b, the shutter 11 which is formed in two-body with the axis section is arranged so as to fit the axis section into the axis bearing section mounted to the sub-holder 10b, thereby mounting the shutter 11 in the direction of an arrow X.

Then, the sub-holder 10b having mounted thereon the shutter 11 is fit into the main holder 10a in the direction of an arrow Y.

In the structure wherein the spring 15 rotates without being restricted, the arm sections of the spring 15 rotate in reverse direction, and the spring 15 cannot be mounted in a proper direction.

In response, according to the structure of the present embodiment, the rotation restriction section 20 for limiting the rotations of the arm section of the spring 15 is mounted at position between the arm sections of the spring 15 of the main holder 10a. With this structure, as illustrated in FIG. 5(b), both arms of the spring 15 in contact with the inner surface of the shutter 11 come in contact with the rotation restriction section 20, and the rotations of the rotation restriction section 20 are restricted. As a result, it is possible to make the sub-holder 10b into the main holder 10a in a normal direction by the spring 15 without inversely rotating the arm sections of the spring 15.

Furthermore, this rotation restriction section 20 also has a function of restricting the opening of the shutter 11 in the open state of the shutter 11. Namely, when the shutter 11 is opened as being pressed by the insertion of the plug section 13a, the arm sections of the spring 15 in contact with the back surface of the shutter come in contact with the rotation restriction section 20, and the opening of the shutter 11 is restricted at that position. As a result, even when the plug section 13a of the optical fiber cable 13 is inserted in an oblique direction, the plug section 13a can be inserted to the predetermined position without applying overweight to the shutter 11.

Figure 6:
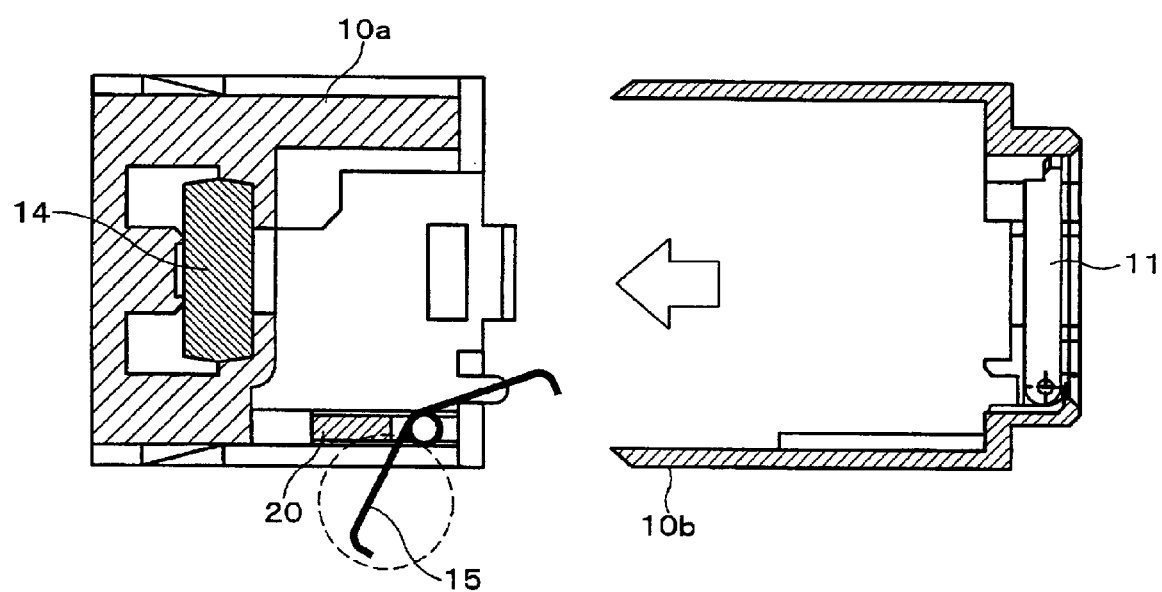
FIG. 6 is a cross-sectional view of the upper surface, which explains the process of assembling the optical connector in accordance with the present embodiment.

Furthermore, even in such event that the spring 15 is not set properly as illustrated in FIG. 6, as such improper setting of the spring 15 becomes obvious from the situation where the side wall of the sub-holder 10b is caught by the rounded leading end of the spring 15 when assembly by inserting the sub-holder 10b into the main holder 10a, or the shutter 11 cannot be closed. As a result, the production of defective products with improper shutter function can be prevented beforehand.

In the foregoing preferred embodiment, explanations have been given through the case where the horn plug section is adopted for the plug section 13a of the optical fiber cable 13, and the pair of guide groove sections is formed; however, the present invention is not intended to be limited to this structure.

Figure 7:
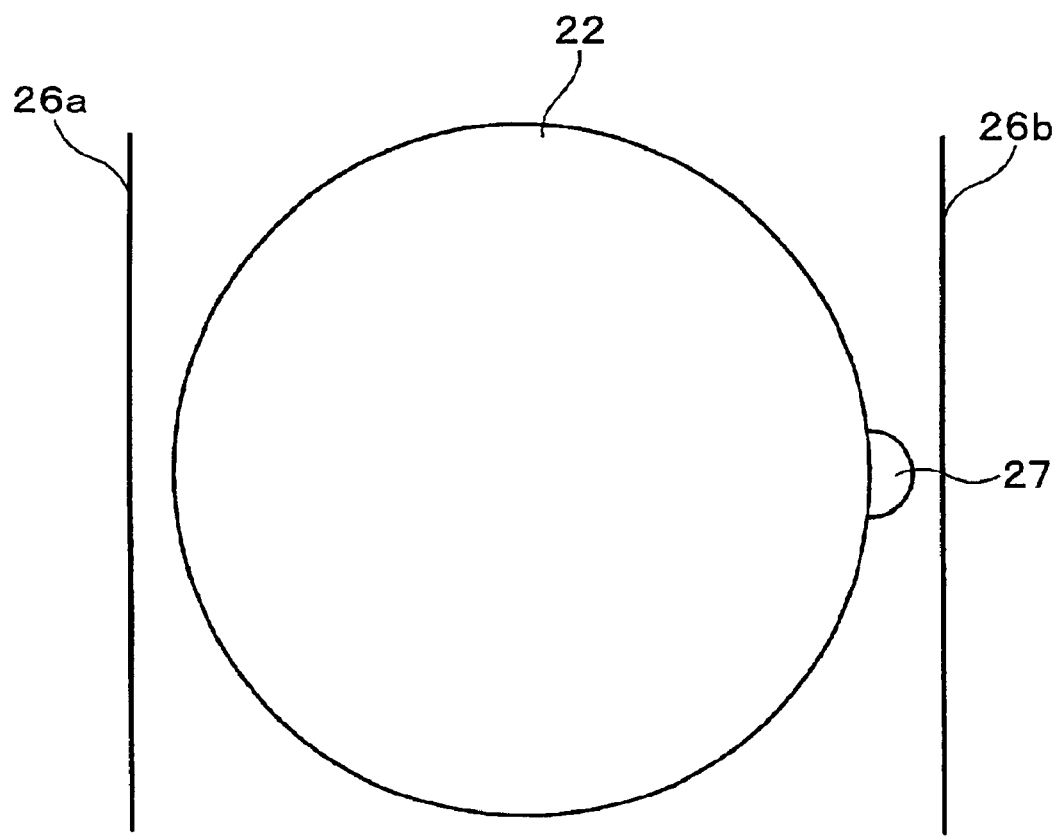
FIG. 7 is a conceptual front view of the optical connector taken from the plug insertion opening provided with a single guide groove section applied to a round plug.
Figure 8:
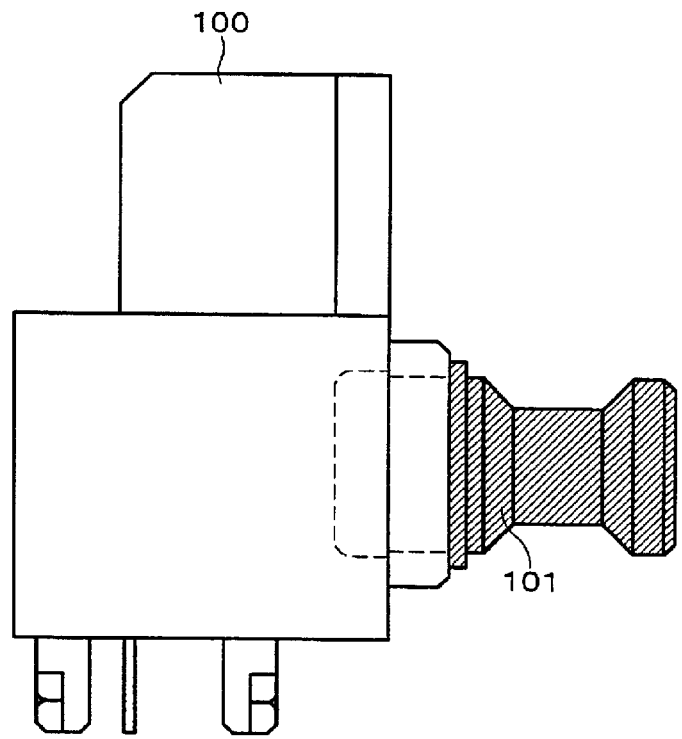
FIGS. 8(a) and 8(b) are explanatory views illustrating the schematic structure of the first conventional optical connector.
Figure 8:
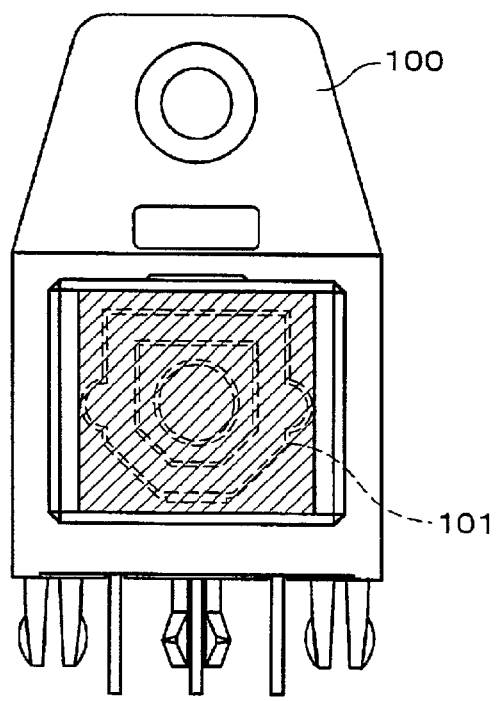
Figure 9:
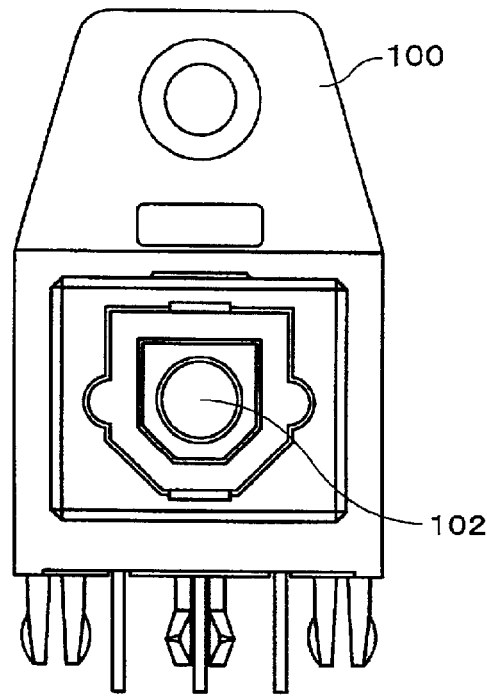
FIGS. 9(a) and 9(b) are explanatory views illustrating the schematic structure of the first conventional optical connector.
Figure 9:
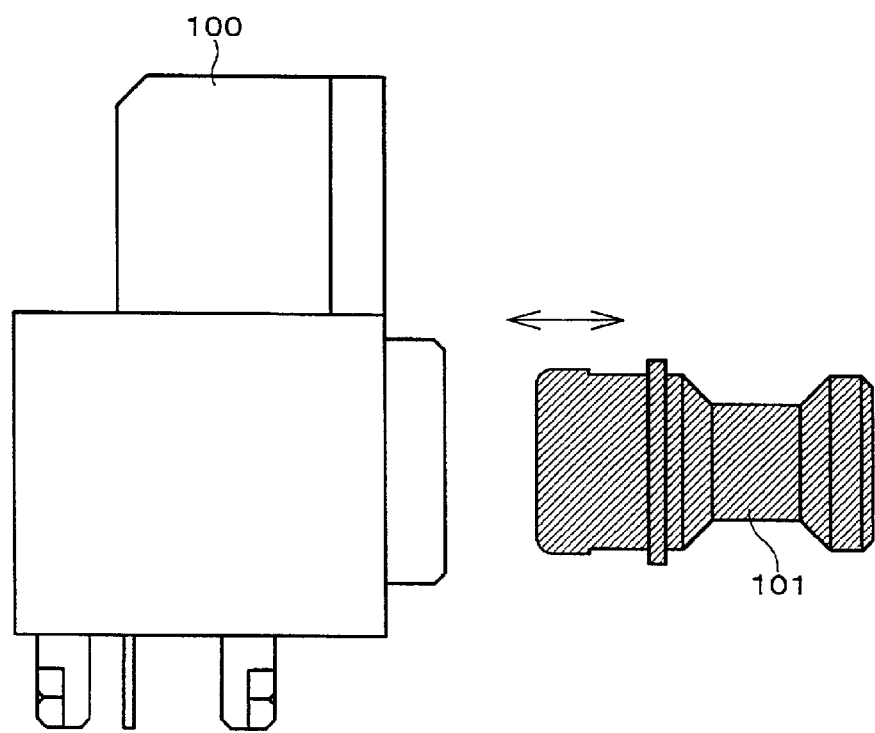
Figure 10:
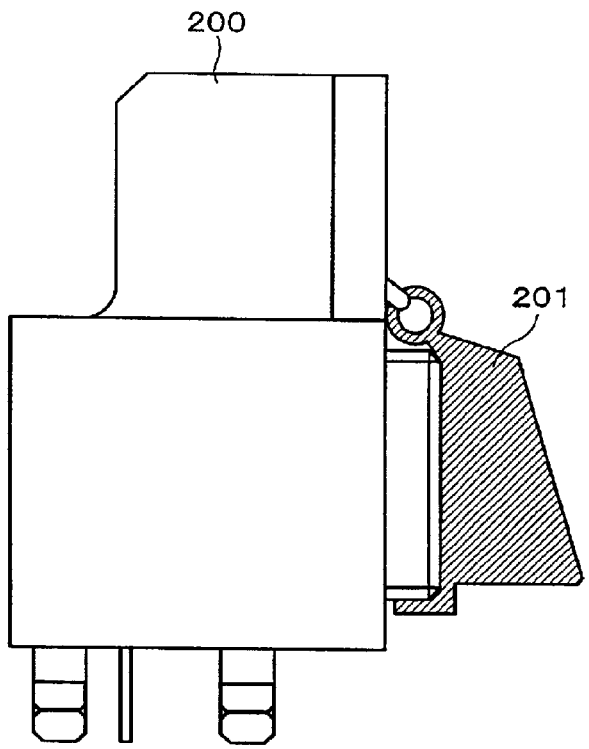
FIGS. 10(a) and 10(b) are explanatory views illustrating the schematic structure of the second conventional optical connector.
Figure 10:
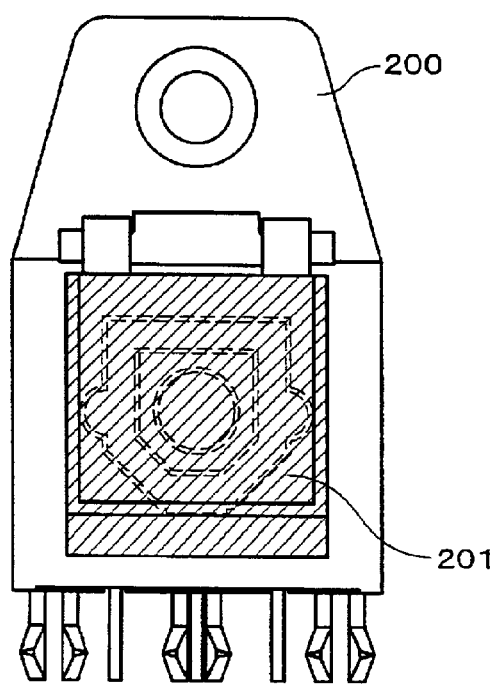
Figure 11:
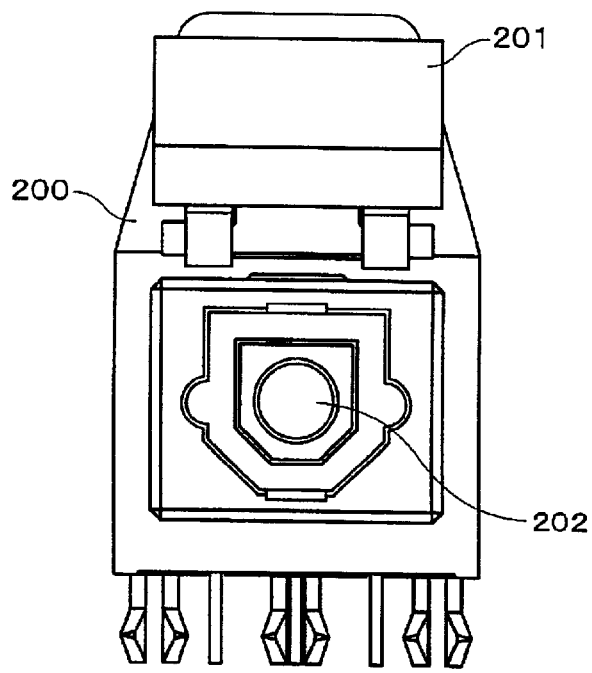
FIGS. 11(a) and 11(b) are explanatory views illustrating the schematic structure of the second conventional optical connector.
Figure 11:
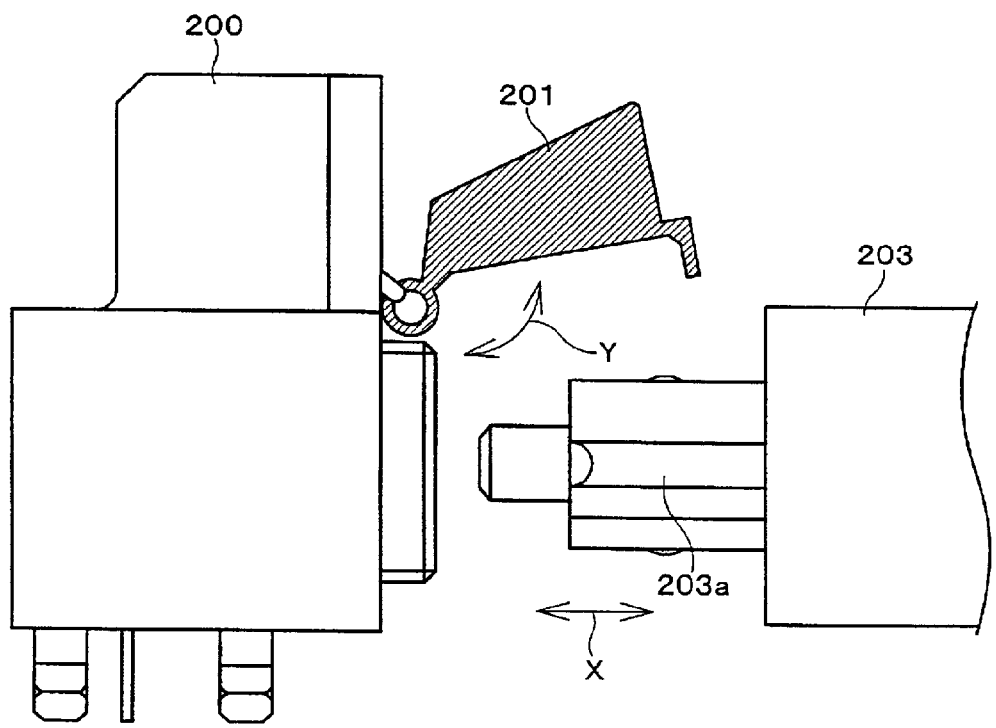
Figure 12:
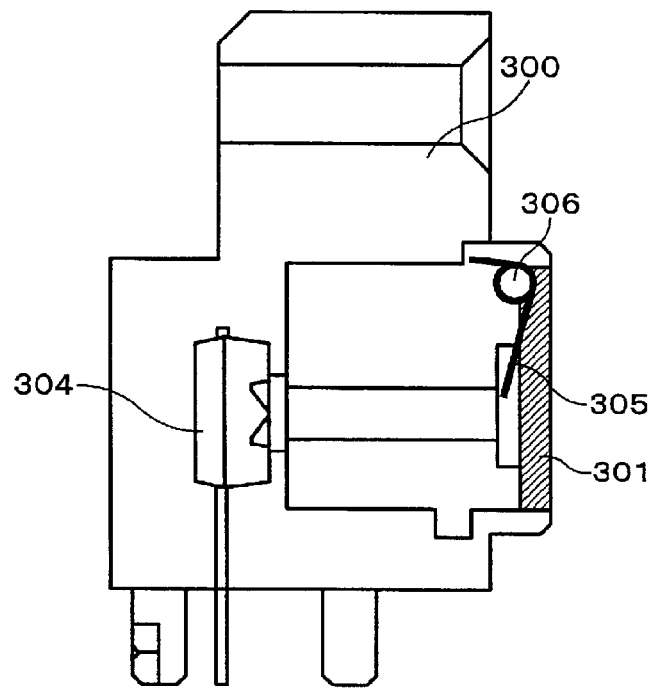
FIGS. 12(a) and 12(b) are explanatory views illustrating the schematic structure of the third conventional optical connector.
Figure 12:
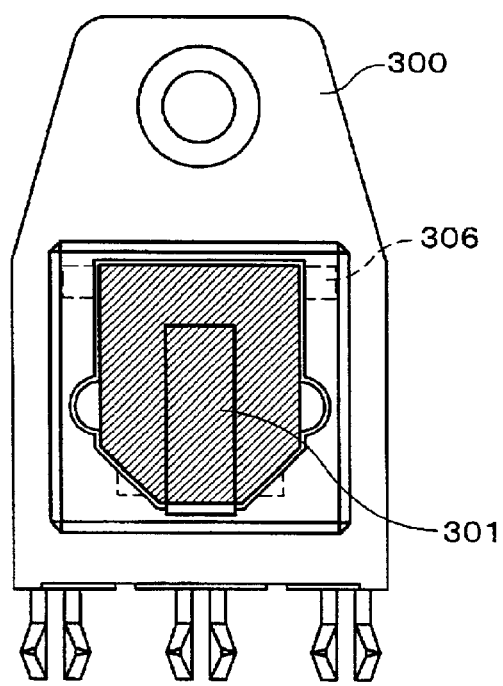
Figure 13:
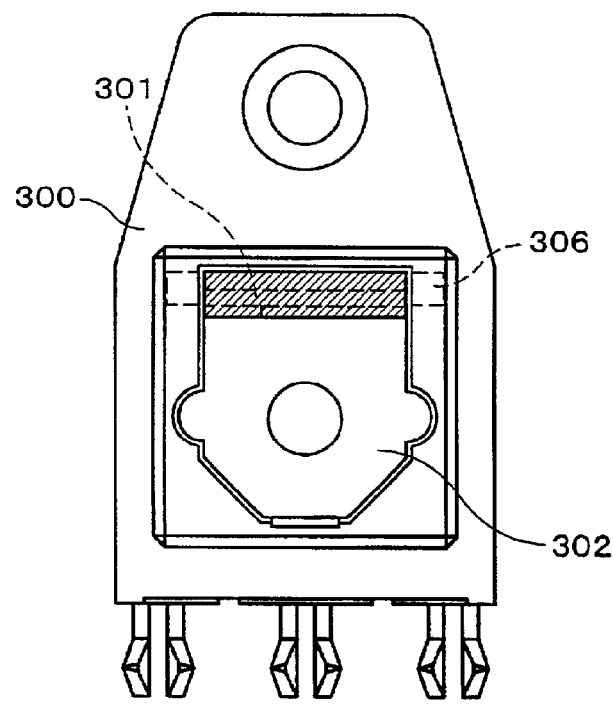
FIGS. 13(a) and 13(b) are explanatory views illustrating the schematic structure of the third conventional optical connector.
Figure 13:
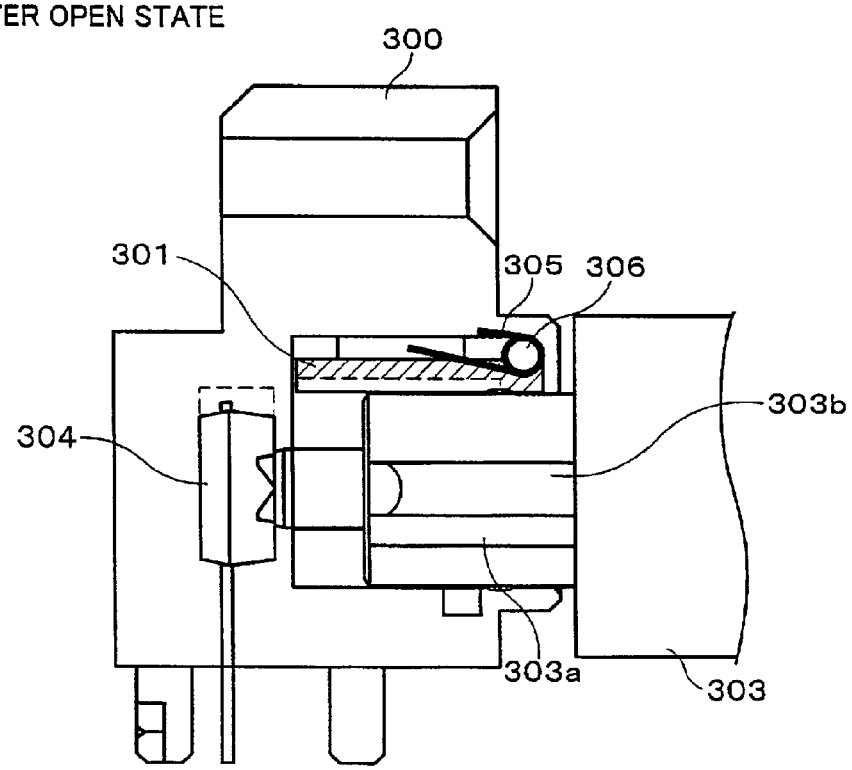
Figure 14:
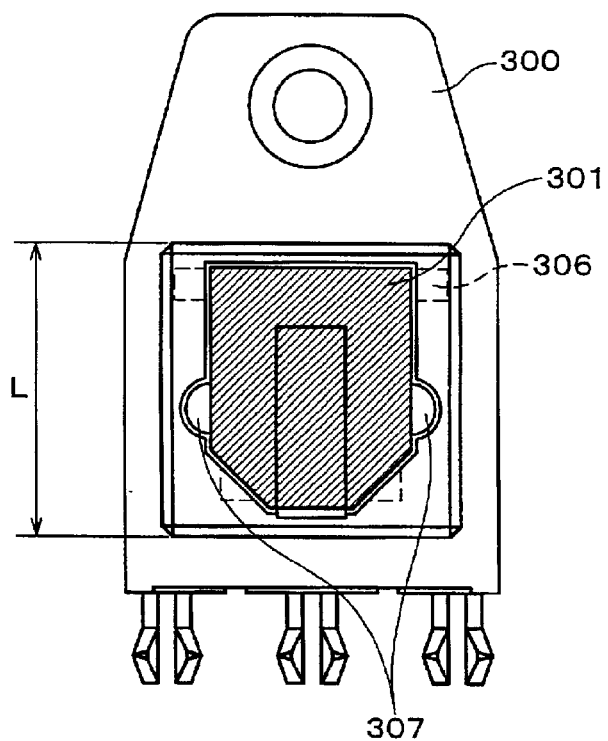
FIGS. 14(a) and 14(b) are explanatory views illustrating the schematic structure of the third conventional optical connector.
Figure 14:
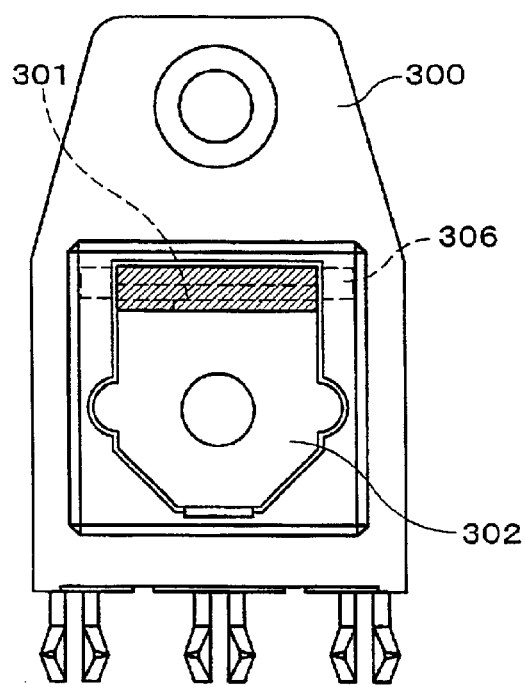
Figure 15:
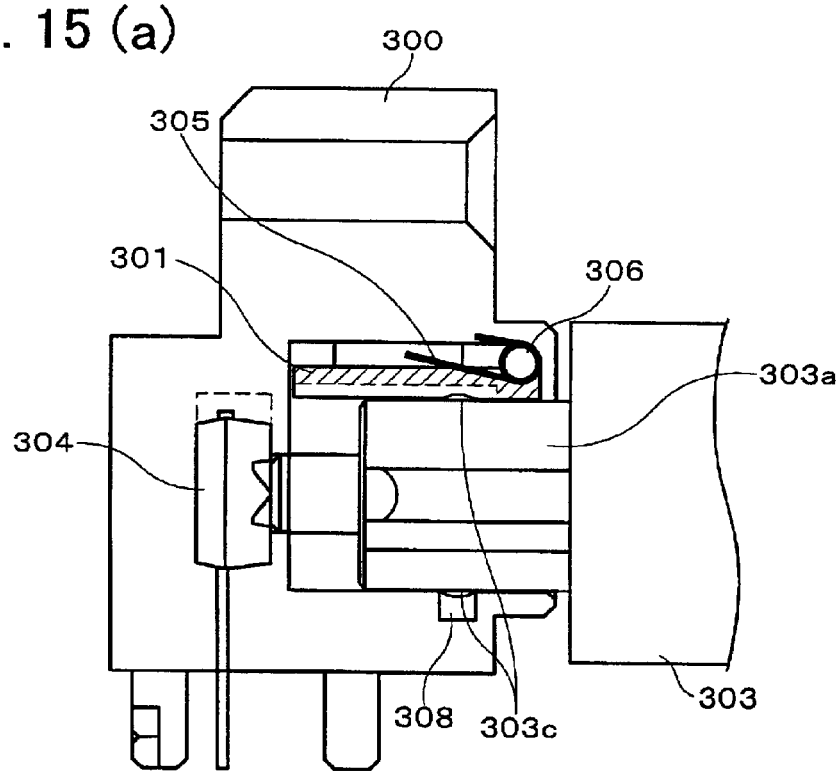
FIGS. 15(a) and 15(b) are explanatory views illustrating the schematic structure of the third conventional optical connector.
Figure 15:
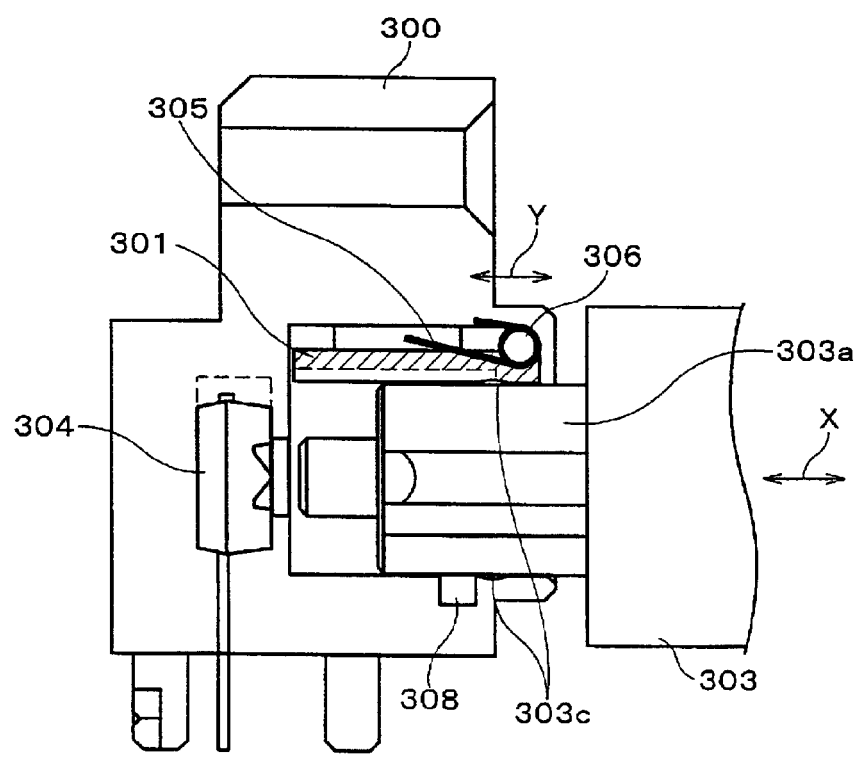
Figure 16:
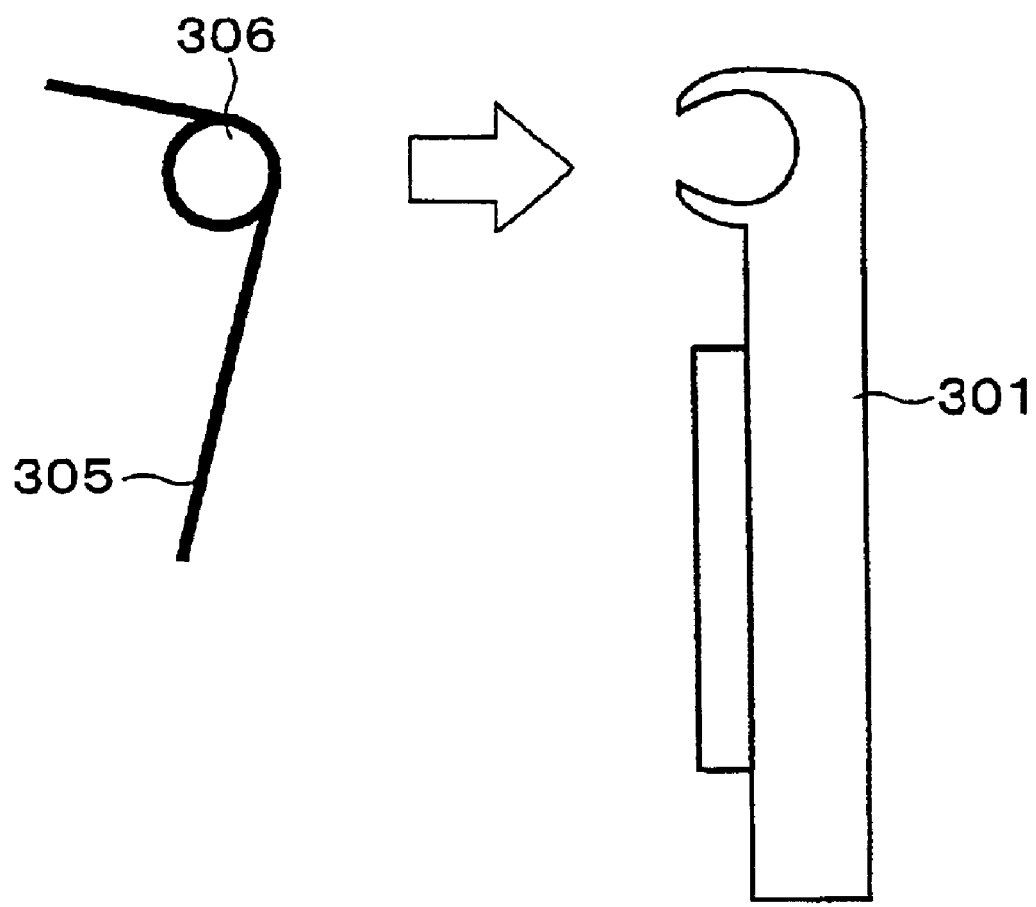
FIG. 16 is a side view illustrating the structure of the rotation axis of the shutter and the spring of the third conventional optical connector.

For example, as illustrated in the schematic front view as seen from the side of the plug insertion opening of FIG. 7, a round plug with a single guide groove 27 may be adopted. In this case, the shutter is rotated about the rotation axis 26a or 26b positioned substantially vertical with respect to the line connecting the guide groove section 27 and the part of the inner surface of the plug insertion section 22 facing the guide groove section 27. Further, the surface of the shutter is shaped to be curved corresponding to the round shape of the plug insertion opening, and the inner wall in contact with the shutter of the plug insertion opening is shaped to be curved so as to close the plug insertion opening completely with the shutter. Other than the foregoing, the structure of the present embodiment can be applied to the optical connector shown in FIG. 7.

For the projected guide sections and the guide groove sections, it is not necessarily to adopt those having semi-circular cross-section, and, for example, those having V-shaped or polygon cross-section may be equally adopted.

Figure 17:
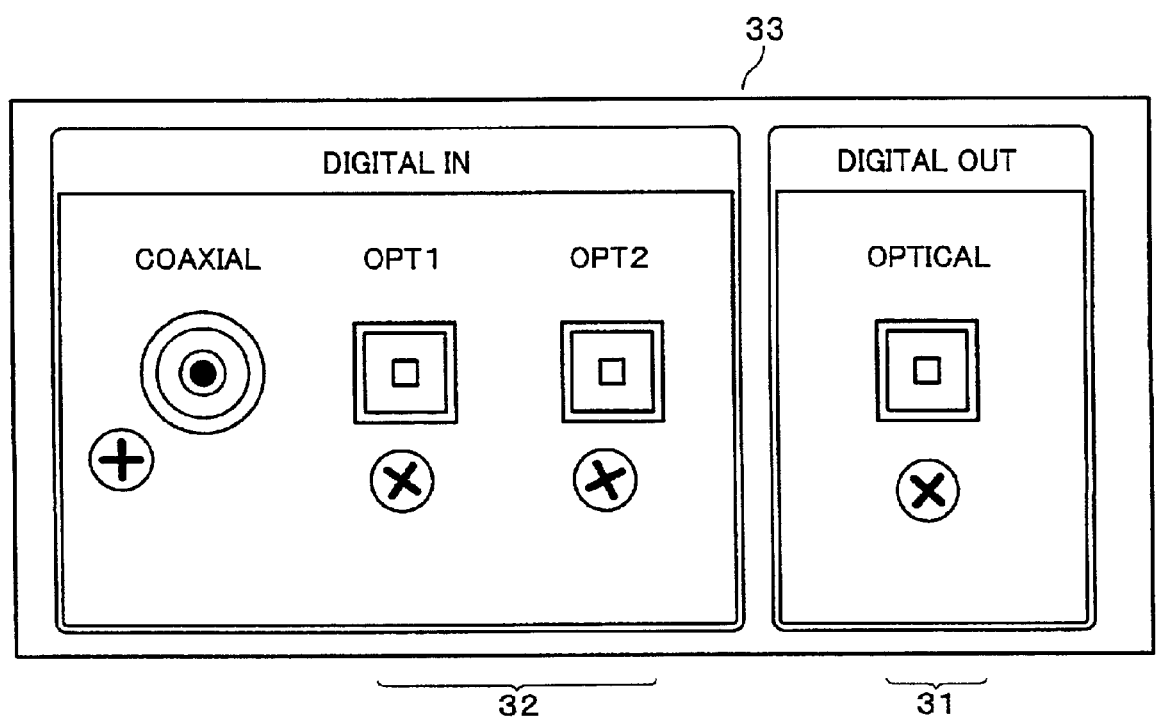
FIG. 17 is a view showing the state where the optical connector is mounted to the apparatus.

As illustrated in FIG. 17, the described optical connector is arranged such that a pair of the transmitting end optical connector which serves as the optical output terminal and the receiving end optical connector 32 which serves as the optical input terminal are mounted to the input/output terminal section on the front face or back face of the apparatus main body, and are then mounted to the apparatus 33. In the structure shown in FIG. 17, the single transmitting end optical connector 31 and two receiving end optical connectors 32 are mounted. The mounted state of the optical connector to the apparatus is not intended to be limited to the foregoing, and, for example, either one of the transmitting end optical connector and the receiving end optical connector may be mounted.

As illustrated in FIGS. 2(a) and 2(b), the optical connectors 31 and 32 have threaded holes 19 formed parallel to the plug insertion openings 12 above the main holders 10a, and are fixed by screwing up the threaded holes 19 of the optical connectors 31 and 32 and the threaded hole of the apparatus with screws and screw nuts. In FIG. 17, the optical connectors 31 are 32 are mounted upside down.

The optical connectors 31 and 32 as mounted to the apparatus 33 are exposed to the outside. In this state, the parts (visible parts) of the optical connectors 31 and 32 by the user from the side of the apparatus 33 are the shutter 11 and the parts of the holders 10a and 10b positioned in close vicinity of the shutter 11.

In this state, by selecting different color for at least one of the shutter 11, the holder 10a and the holder 10b (visible parts) between the transmitting end optical connector 31 and the receiving end optical connector 32, the transmitting end connector 31 and the receiving end optical connector 32 can be identified (discriminated) with ease. Especially, it is preferable to change colors for the shutters 11 and/or the holders 10b between the transmitting end optical connector 31 and the receiving end optical connector 32 which are likely to be mixed up in the manufacturing process.

Specifically, for example, a red shutter may be adopted for the transmitting end optical connector 31, and a gray shutter may be adopted for the receiving end optical connector 32. These red shutter and the gray shutter can be formed, for example, by mixing a desired coloring material into milk white ABS resin.

For the main holders 10a and the sub holders 10b, the same color (black color) may be adopted between the transmitting end optical connector 31 and the receiving end optical connector 32. This black main holders 10a and the sub holders 10b may be formed, for example, by forming black light-shielding resin. The light-shielding resin may be formed, for example, by mixing carbon into milk while resin.

In the above example, color shutters are adopted for both of the transmitting end shutter and the receiving end shutter (other than black). However, the color shutter may be adopted only for one of the shutters, and for the other shutter, black light shielding resin in the same color as the holders may be adopted.

According to the foregoing structure, a manufacturer or a fitter can identify at once the transmitting end optical connector and the receiving end optical connector in their possessions which are formed substantially in the same shape and in the same color (other than the discrimination means), before mounting these optical connectors to the apparatus based on color of the shutter 11 (discrimination means). It is also possible for the user to identify at once the transmitting end optical connector and the receiving end optical connector in the pair of optical connectors.

According to the foregoing optical connector of the present embodiment, it is possible for the manufacture or the fitter of the optical connector to the apparatus, and the user of the apparatus to identify at once with their eyes the respective optical connectors without closing or opening the shutter with a tapered thin stick. It is therefore possible to the optical elements from being damaged by mistake. Furthermore, the spaces for indicating "IN" and "OUT" are not required, and it is therefore possible to make the apparatus smaller in size and thinner.

Furthermore, by adopting at least either one of the shutter 11 and the sub-holder 10b in the same color as the emitted light of the optical element (light emitting element) as stored in the transmitting end optical connector, light as leaked from the spacing between the sub-holder 10b serving as the optical connector main body and the shutter 11 can be made less recognizable for the user. Furthermore, as the shutter 11 also closes the guide groove section 17, the leakage of light from the guide groove section 17 can be prevented.

Specifically, in the case of adopting the light emitting element which emits the red emitting light, by adopting the shutter 11 or the sub-holder 10b in the same red color, the light as leaked from the spacing between the shutter 11 and the sub-holder 10b can be made less recognizable.

As described, the optical connector in accordance with the present invention is arranged so as to include:

an insertion opening for inserting therein a plug section of an optical fiber cable, an optical element which is to be optically connected to the optical fiber cable as inserted in the insertion opening, and a shutter for opening and closing the insertion opening; and which is to be mounted to an apparatus and serves as a connector of the apparatus, the optical connector, including:

discrimination means in a part exposed to the outside for making the optical connector distinguishable from an optical connector of other type.

According to the foregoing structure, the type of the optical connector (the transmitting end optical connector or the receiving end optical connector) can be identified with ease both in the state where the optical connector is mounted to the apparatus and the state where the optical connector is not mounted without opening or closing the shutter.

It is desirable that the optical connector of the present invention having the above arrangement be further arranged such that:

the discrimination means is provided for identifying color from that of other optical connector; and the exposed part of the optical connector has color distinguishable from that of other optical connector.

According to the foregoing structure, the type of the optical connector (the transmitting end optical connector or the receiving end optical connector) can be identified at once with eyes.

It is desirable that the optical connector of the present invention be further arranged such that:

the discrimination means is provided for identifying a transmitting end optical connector and a receiving end optical connector; and a part exposed to the outside of one of the transmitting end optical connector and the receiving end optical connector has different color from that of the other optical connector.

According to the foregoing structure, whether the optical connector is the transmitting end optical connector or the receiving end optical connector can be identified at once with eyes.

It is desirable that the optical connector having the above structure be further arranged such that:

the discrimination means is composed of the shutter.

According to the foregoing structure, the type of the optical connector can be identified only from the shutter which is exchangeable for the production.

It may be also arranged so as to add an identification symbol of the optical connector (for example, "O" for the transmitting end optical connector and "I" for the receiving end optical connector) on the surface of the outside of the shutter, so that the type of the optical connector can be identified with ease.

It may be also arranged such that each optical connector is formed in shape distinguishable from other.

It is also desirable that the optical connector having the foregoing structure be arranged such that the shutter has similar color to an emission color of the optical element.

According to the foregoing structure, the light as leaked from the spacing between the optical connector main body and the shutter can be made less recognizable with ease.

It is desirable that the optical connector having the above structure be arranged such that the shutter is an in-swinging shutter which swings inward in the insertion opening.

According to the foregoing structure, there is no need to confirm by opening the shutter inward with a tapered member, thereby preventing an optical element from being damaged by mistake.

An apparatus of the present invention is arranged so as to include the optical connector of the foregoing structure.

According to the foregoing structure, it is possible for the user to identify the type of the optical connector from outside of the apparatus with ease, thereby preventing a connection inferior between the apparatuses with ease.

Another apparatus of the present invention is arranged so as to include: a transmitting end optical connector and a receiving end optical connector to which a plug section of an optical fiber cable is to be inserted, for communication with other apparatus, wherein:

a part exposed to the outside of the transmitting end optical connector and a part exposed to the outside of the receiving end optical connector from the apparatus have different colors.

According to the foregoing structure, it is possible for the user to identify the transmitting end optical connector and the receiving end optical connector from the outside of the apparatus with ease, thereby preventing a connection inferior between the apparatuses with ease. Further, the light as leaked from the spacing between the optical connector main body and the shutter can be recognized with ease irrespectively of whether or not the optical connector is mounted to the apparatus.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An optical connector for connecting to an optical data apparatus, said optical connector comprising:

an insertion opening for inserting therein a plug section of an optical fiber cable, an optical element positioned in said insertion opening of said optical connector and optically connected to the optical fiber cable when said fiber cable is inserted in the insertion opening, and discrimination means being a part of said optical connector exposed to the outside for making said optical connector distinguishable from other optical connectors, said discrimination means including a shutter for opening and closing the insertion opening, said shutter for mounting and connecting to said apparatus, said discrimination means being provided with an identifying color to be distinguishable from the other optical connectors, said shutter has similar color to an emission color of said optical element, and said shutter is an in-swinging shutter which rotates in place about a rotation axis inward in said insertion opening.

2. The optical connector as set forth in claim 1, wherein:

said exposed part of said optical connector has color distinguishable from that of other optical connector.

3. The optical connector as set forth in claim 1, wherein:

said discrimination means includes a transmitting end of said optical connector and a receiving end of said optical connector; and said part exposed to the outside includes said transmitting end of said optical connector or said receiving end of said optical connector and each said end has a different color from that of the other end of said optical connector to be visibly distinguishable.

4. An apparatus, comprising:

an optical connector which includes an insertion opening for inserting therein a plug section of an optical fiber cable, an optical element positioned in said insertion opening is to be optically connected to said optical fiber cable when said cable is inserted in said insertion opening, and discrimination means positioned in a part of said optical connector so to be visible and distinguishable from other optical connectors, said discrimination means including an in-swing shutter which rotates in place about a rotation axis for opening inward in said insertion opening and closing said insertion opening, and said optical connector, is to be mounted to an apparatus main body with said discrimination means exposed to the outside of said optical connector to be distinguishable from an optical connector of another type, said discrimination means having an identifying color different from that of the other optical connector, and said shutter has similar color to an emission color of said optical element.

5. The apparatus as set forth in claim 4, wherein:

said visible part of said optical connector has a color distinguishable from that of the other type of optical connector.

6. The apparatus as set forth in claim 4, wherein:

said discrimination means includes a transmitting end of said optical connector and a receiving end of said optical connector; and each said end having a part exposed to the outside of said optical connector and each said end having a different color from that of the other end of said optical connector.

7. The apparatus as set forth in claim 4, wherein:

said shutter swings in when receiving said cable.

8. The apparatus as set forth in claim 7, wherein:

said shutter has similar color to an emission color of said optical element.

9. The apparatus as set forth in claim 7, wherein:

said in-swinging shutter rotates in place about a rotation axis inward in said insertion opening.

10. An apparatus for communication, comprising a transmitting end optical connector and a receiving end optical connector, each said connector having an insertion opening and an optical element positioned in said insertion opening; and a discrimination means exposed to the outside of said transmitting end optical connector and a discrimination means exposed to the outside of said receiving end optical connector, each said discrimination means including a shutter for opening and closing the insertion opening, and each said shutter having different colors to be distinguishable and visible, each said shutter having similar color to an emission color of said corresponding optical element and said shutter is an in-swinging shutter which rotates in place about a rotation axis inward in said insertion opening.

11. The apparatus as set forth in claim 10, wherein:

said optical connector being provided with a spring and a shutter, said spring for closing said shutter.

12. The apparatus as set forth in claim 10, wherein:

said discrimination means for identifying said transmitting end of said optical connector and said receiving end of said optical connector, and an insertion opening to which a plug section of an optical fiber cable is to be inserted.

13. The apparatus as set forth in claim 10, wherein:

said optical connector includes an insertion opening for receiving a plug section of an optical fiber cable.

14. The apparatus as set forth in claim 13, wherein:

each said shutter for opening and closing the insertion opening, and at least one of said shutters has similar color to an emission color of an optical element positioned in the insertion opening.

* * * * *